Jan. 15, 1935. R. S. BISSINGER ET AL 1,988,069
CONTROLLING APPARATUS FOR MOTION PICTURE PROJECTING MACHINES
Filed Nov. 16, 1932 3 Sheets-Sheet 1

Inventors
R. S. Bissinger
H. S. Warren

By H. S. McDowell
Attorney

Inventors
R. S. Bissinger
H. S. Warren
W. S. McDowell
Attorney

Jan. 15, 1935. R. S. BISSINGER ET AL 1,988,069
CONTROLLING APPARATUS FOR MOTION PICTURE PROJECTING MACHINES
Filed Nov. 16, 1932 3 Sheets-Sheet 3
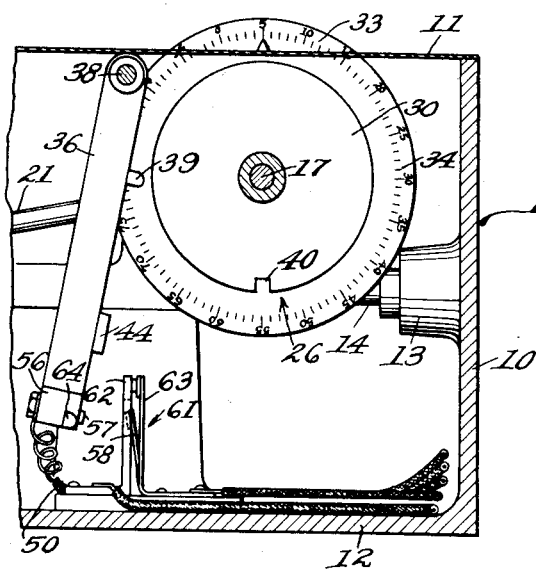
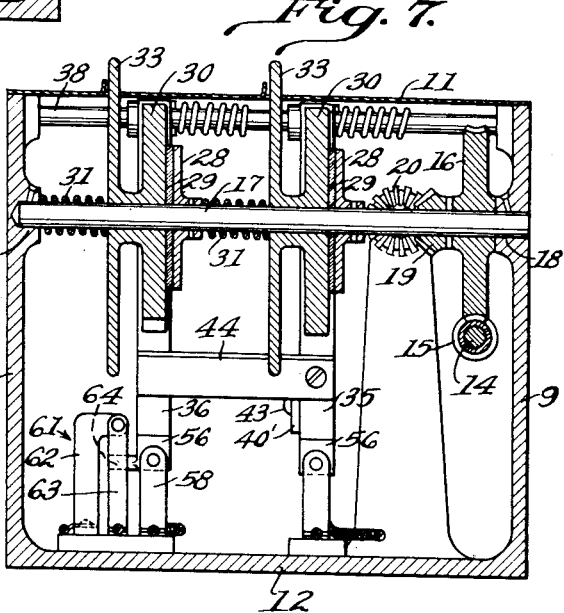
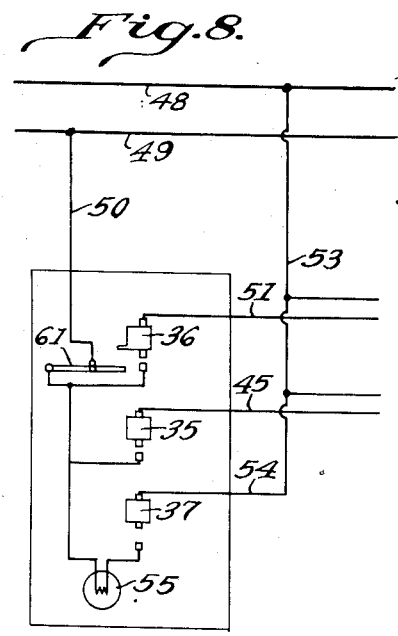
Inventors
R. S. Bissinger
H. S. Warren
By
H. S. McDowell
Attorney Patented Jan. 15, 1935

1,988,069

UNITED STATES PATENT OFFICE 1,988,069

CONTROLLING APPARATUS FOR MOTION PICTURE PROJECTING MACHINES

Robert S. Bissinger and Harold S. Warren, Columbus, Ohio

Application November 16, 1932, Serial No. 642,914

8 Claims. (Cl. 88—17)

This invention relates to an apparatus for controlling motion picture projecting machines and is more particularly directed to an apparatus for automatically controlling such machines during the operation thereof, which machines are usually employed in pairs and operating alternately, so as to effect the automatic change-over from the first machine to the second when the reel of film of the first machine has been run through or to a predetermined point.

An object of the invention is to provide an apparatus of this kind which is connected up for movement with one of the projecting machines, and wherein is employed a manually set mechanism operating, after a predetermined length of film has passed through the machine connecting the apparatus, to automatically close operating circuits for the other machine setting the same in operation. A similar apparatus may also be connected with the latter machine to close operating circuits for the first machine after the film in the second machine has been shown.

Another object of the invention is to provide a mechanism whereby the proper sequence of operation is assured in effecting the electrical changes necessary in changing from one projecting machine to another without perceptible interception in the projection between the successive reels of films.

More specifically, the invention consists of an apparatus, one for each of the picture projecting machines, wherein is provided a manually set mechanism geared for operation with a machine and so functioning mainly as to complete a circuit for the driving motor of the machine not in operation at a time when the film of the operating machine approaches its end and to also close circuits effecting the control of the dowser mechanisms of each machine which operate to automatically position or remove a light obstructing plate in the path of the light rays which are projected into the projecting machine and through the film carried therein to project the picture of the film onto the associated screen.

It is also an object of the present invention to provide an apparatus of the aforesaid character which is simple and compact in its construction, durable and reliable in its operation and comparatively economical to manufacture.

With these and other objects in view which will appear as the description proceeds, the invention consists in the novel features of construction, combination of elements and arrangements of parts hereinafter to be fully described and pointed out in the appended claims.

In the accompanying drawings:

Fig. 6 is a similar view taken on the line 6—6 of Fig. 2;

Fig. 7 is a transverse vertical sectional view taken on the line 7—7 of Fig. 2;

Fig. 8 is a diagrammatic view showing the wiring of one of the controlling apparatus.

Figure 1:
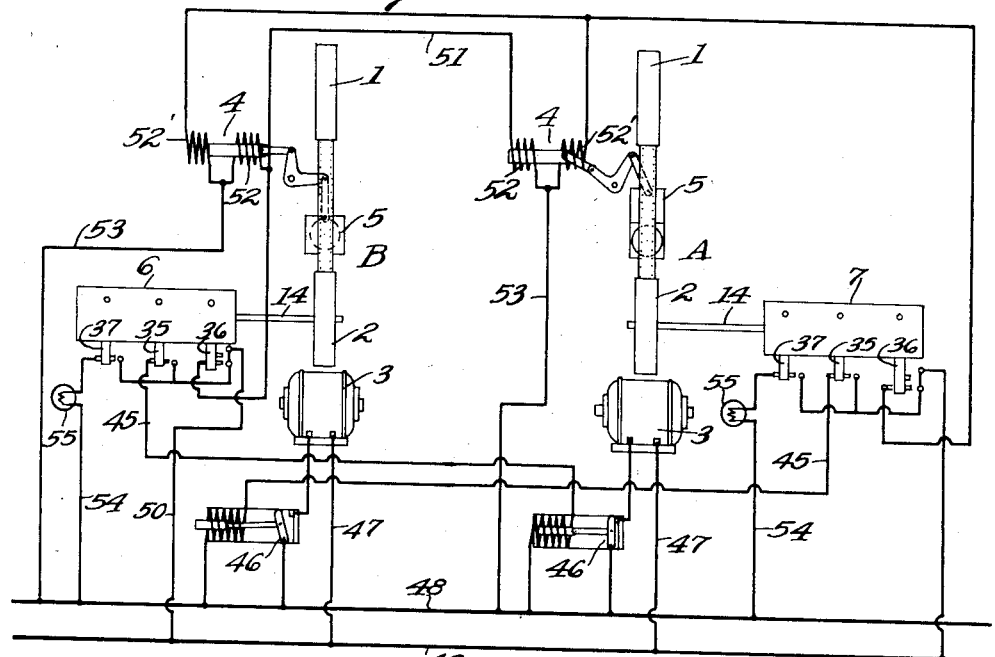
Fig. 1 is a diagrammatic showing of a pair of picture projecting machines with each of which are connected a controlling apparatus, the construction and arrangement of which comprises the present invention.
Figure 2:
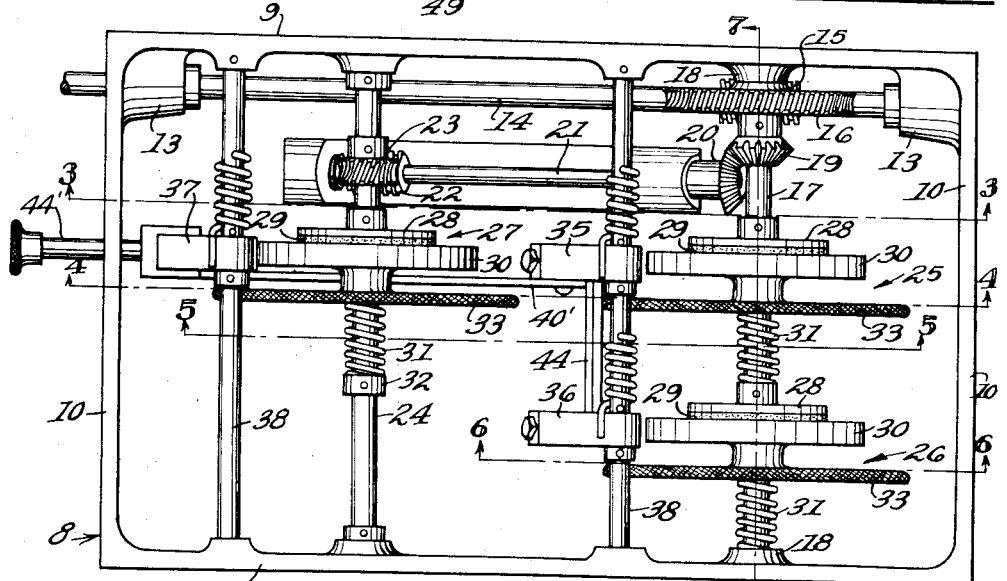
Fig. 2 is an interior view of one of the apparatus showing the mechanism therein.
Figure 3:
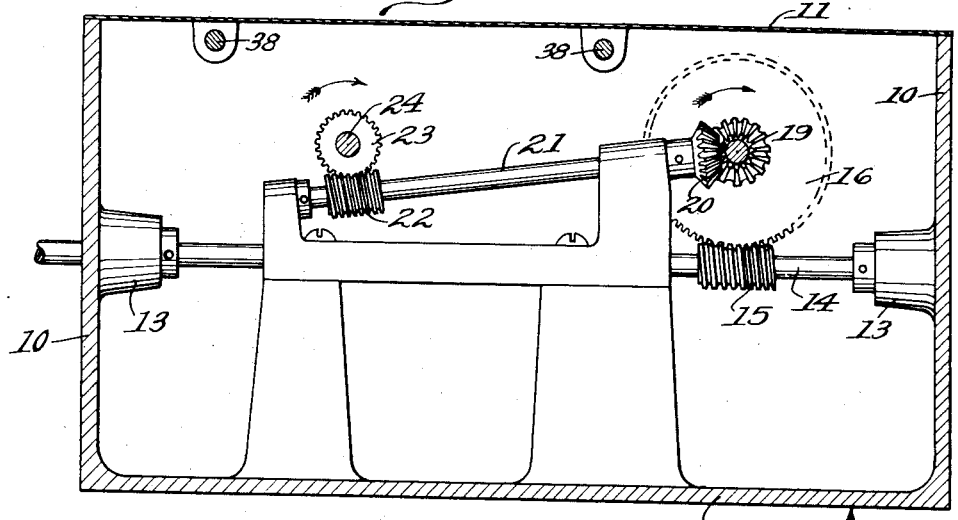
Fig. 3 is a vertical longitudinal sectional view taken on the line 3—3 of Fig. 2.
Figure 4:
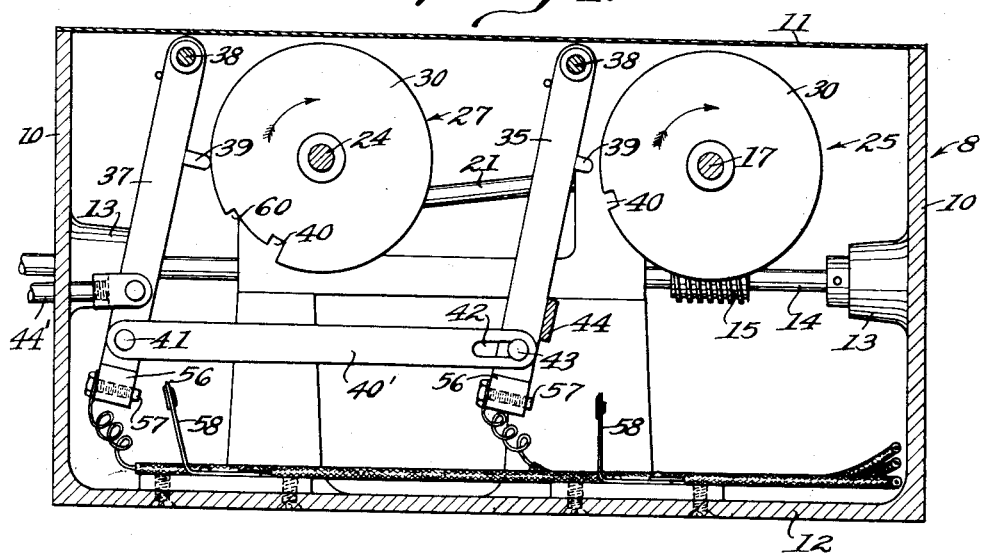
Fig. 4 is a similar view taken on the line 4—4 of Fig. 2.
Figure 5:
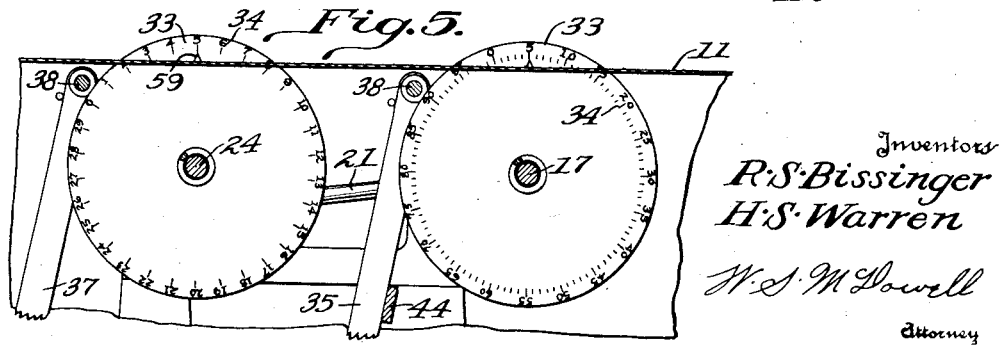
Fig. 5 is a detail vertical longitudinal sectional view taken on the line 5—5 of Fig. 2.

Referring to the drawings in detail and more particularly to Fig. 1 thereof, the letters A and B designate two projecting machines positioned alongside one another so that the machines may be alternately employed for projecting pictures on an associated screen as is usual in apparatus of this nature. Each of the projecting machines includes an upper and a lower film receiving reel 1 and 2 and a motor 3 for effecting the movement of the film from one reel to the other. Also arranged in connection with the machines and located between the upper and lower reel of each thereof are electrically operated dowser mechanisms 4 which include movable plates 5 for controlling the light beams of the projecting machines. Electrical circuits are provided for the motors and the dowser mechanisms, in the ordinary arrangement of which, switches are positioned that are usually thrown by the operator of the apparatus.

As it is a rather difficult task to operate the various switches at the correct time in effecting the change-over from one machine to the other so as not to cause an interruption in the projection between successive reels or films, the invention provides for an automatic control of the various circuits and to this end there is provided in connection with each of the projecting machines controlling apparatus which are designated generally by the numerals 6 and 7 respectively. Each of the controlling apparatus which is connected for movement with its respective machine, is so arranged that it will control the circuits for the operation of the other machine. As the construction of each of the controlling apparatus is similar or identical in form, the description of one will suffice for the other.

The controlling apparatus which is conveniently located near a machine and driven thereby comprises in this instance a rectangular casing 8 including side and end walls 9 and 10, and top and bottom walls 11 and 12 respectively. The casing 8 may be made of any suitable material and formed in any convenient size to be readily installed in connection with the projecting machine. Extending into the casing 8 and journaled within spaced bearings 13 therein is a shaft 14 which is connected for rotation with the main operating shaft of the machine. The inner end of the shaft 14 is provided with a worm 15 which intermeshes with a worm gear 16 fixed for rotation with a shaft 17 arranged transversely and at one end of the casing 8. The ends of the shaft 17 are journaled for rotation within bearings 18 formed in this instance with the side walls 9 of the controlling apparatus. Mounted upon the shaft 17 is a beveled gear 19 which meshes with a similar gear 20 attached at one end of a shaft 21 which has its other end equipped with a worm 22 meshing in turn with a worm gear 23. This gear is connected with a second shaft 24 which is also transversely arranged of the casing and longitudinally spaced from the shaft 17. It will be seen that by the provision of the reduction gearing between the various shafts, the shaft 24 moves at slower speed than the shaft 17 which ratio of the latter has been so calculated that it will turn once upon one hundred revolutions of the shaft 14, with the shaft 24 turning one-thirtieth of a revolution with respect to the shaft 17. The purpose of this speed reduction will appear later.

Mounted upon the shafts 17 and 24 are circuit controlling members indicated generally by the numerals 25, 26 and 27. Each of these members are identical in construction and include a friction disk 28 which is attached for rotation with its associated shaft and having a lining 29 formed upon one of its surfaces which is made from leather or other suitable material, to provide a frictional contact with a circular clutch plate 30 loosely mounted upon the shaft. The plate 30 is held in contact with the lining 29 by a coil spring 31 positioned around the shaft and held under tension by a collar 32 keyed or otherwise secured for rotation with the shaft. Formed integral with the clutch plate of each of the circuit controlling members is a dial 33 which is graduated as at 34 and has a portion of its periphery extending through a slot formed in the top wall 11 of the casing 8. The outer peripheral edge of the dial may be scored or roughened so that the dial may be readily manipulated by the operator setting the same.

Arranged adjacent each of the clutch plates 30 are switch arms designated by the numerals 35, 36 and 37 which are substantially vertically positioned and have their upper ends pivoted upon rods 38 extending transversely of the casing and anchored to the side walls thereof. Formed with each of the switch arms are projections 39 which engage the periphery of the plates 30 and adapted to be received within notches 40 when the plates are so positioned that the notches and said projections registering thereby arresting the movement of the plates. Connecting the switch arms 35 and 37 is a link member 40' which has one of its ends pivoted as at 41 to the arm 37 at its opposite end slotted as at 42 in which slot is received a pin 43 connecting the link with the arm 35. Secured to the arm 35 is a bar 44 which is so positioned that the switch arm 36 will rest thereagainst preventing the projection 39 thereof from engaging the clutch plate 30 of the circuit controlling member 26. It will be seen that the arrangement of the link 40' and the bar 44 is such that the switch arms 35 and 36 will be out of engagement with their respective clutch plates and will be held in this position until the slots 40 formed in the clutch plate 30 of the controlling member 27 has registered with the projection 39 of the switch arm 37, at which time the latter will be moved or advanced so that the link 40, due to the provision of the slot 42, will permit the arm 35 or its projection 39 to engage with the periphery of its associated clutch plate. When this clutch plate in turn has moved so that its slot 40 will register with the projection 39 of the arm 35, to form an interlock therebetween, the movement of the arm 35 will cause the bar 44 connected therewith to move away from the switch arm 36 leaving the same free to engage with its respective clutch plate which in turn will be arrested upon the registering of the slot formed on its periphery with the projection carried by the arm. With the switch arms in this position, all of the clutch plates 30 will be interlocked therewith and prevented from rotating although the shafts 17 and 24 may continue to rotate due to the provision of the slip clutches comprising the linings 29 and the friction disks 28. Connecting the arm 37 is a rod 44' by which the arms may be retracted from engagement with the plates 30.

The switch arms 35, 36 and 37 are each adapted to control the opening and closing of respective circuits, for the operation of the second picture projecting machine, of which the arm 35 controls the primary motor circuit 45 in which is positioned the solenoid operated switch 46 for opening and closing the secondary motor circuit 47 connecting the power input lines 48 and 49. The arm 36 controls the circuit for the electrically operated dowser mechanism 4 of the second projecting machine which circuit includes a conductor 50 connecting the power line 49, the conductor 51 leading to the windings 52 of the dowser mechanisms and the conductor 53 connecting the power input line 48, thus completing the circuit. The switch arm 37 controls the circuit 54 in which a warning light 55 is positioned.

It will be observed that the fields 52 of each of the dowser mechanisms 4 are connected in the circuit controlled by the switch arm 36 and operate to simultaneously effect the uncovering of the projecting lens in one of the machines and the covering of the lens in the other by the movable plates 5. When the fields 52' are connected in the circuit controlled by the switch arm 36 of the other controlling apparatus, this action will be reversed.

Referring to the switches controlled by the arms 35, 36 and 37, the same include insulating blocks 56 carried by the lower ends of the arms and in each of which is positioned a contact pin 57 connected with one line of the circuits while the other line thereof is connected to a resilient contact finger 58 adapted for engagement with the cooperative contact 57 when the arm has moved into locking engagement with its respective clutch plate 30.

The operation of the controlling apparatus including the mechanism just described is substantially as follows.

Assuming that a film is positioned in each of the projecting machines A and B and that the film in the machine A is for example 1755 feet, at the end of which the change-over is to take place from the first to the second machine, the dial 33 of the circuit controlling member 27 is first positioned in the controlling apparatus 7 is first set so as to have its enumerated graduations 17, representing 1700 feet, turned in registration with the indicator pointer 59. The setting of this dial will place the slot 40 out of registration with the projection 39 of the arm 37 which together with the arms 35 and 36 have been moved to positions disengaging all the plates 30 and opening the switches controlled thereby. The next dial to be operated is that of the circuit controlling member 25 which dial is set to indicate, for example, 30 feet, and the dial of the member 26 is set to indicate the remaining 25 feet, after which the projecting machine A may be set in operation by the manual closing of the switch 46. The dowser mechanism in this machine will be so positioned that the projecting lens will be uncovered therein whereas in the other machine, the lens will be obstructed as this machine is not in operation. The shaft 14 which is so connected to the operating mechanism of the projecting machine as to make one revolution for each foot of film traveling past the lens of the machine and the shaft 17, due to the reducing gears 15 and 16, turns one revolution for each 100 feet with the shaft 24 geared so as to make one revolution for 3000 feet of film. It will be seen that when the film approaches the end of its length and has traveled 1700 feet, the dial 33 and the clutch plate 30 of the shaft 24 will move to a position placing the slot 40 of the plate in registration with the projection 39 of its associated switch arm permitting the arm to move to a switch closing position illuminating the signal lamp 55, giving a warning to the operator that the end of the film is approaching. A recess 60 may be provided adjacent the slot 40 to effect an advance closing of the circuit for the light to provide for a longer period of illumination thereof, which has been found desirable as the film is usually moving comparatively rapidly. The space between the contact point 57 and the contact finger 58 is of course such as to be closed after the projection 39 has entered the recess 60 and as the finger 58 is resilient, the same will flex to permit the further setting of the projection 39 within the slot 40 of the clutch plate. This movement of the arm 37 will arrest the rotation of its associated clutch plate and permit the arms 35 and 36 to engage with the periphery of their respective plates so as to arrest their movement when registration between the projections 39 of the arms and the slots 40 of the plates are effected. The clutch plate associated with the arm 35 will be the first of the two to be arrested. Due to the provision of the bar 44 heretofore described, the closing of the switch governed by the movement of the arm 35 will be effected after thirty of the remaining fifty-five feet of the film have passed.

This closing of the switch for the circuit 45 by the arm 35 energizes the solenoid of the switch 46 controlling the circuit 47 of the motor 3 for the projection machine B, thus starting the film through the latter. As the film in this machine has approximately 25 feet of lead at the beginning thereof, which lead will of course vary with each film, it will be seen that the 25 feet will be traveled through the machine B at the time the clutch plate controlling the arm 36 will have moved, registering the slot 40 with the lug 39 of the arm, thus closing the switch controlling the circuit for the dowser mechanisms 4 of both apparatus or machines of which the dowser for the machine A will close and the dowser for the machine B open, thus setting the latter machine in operation to project the picture on the screen. If more than two reels of films are to be used for a picture, the controlling apparatus 6 of the projecting machine B may also have its dials set so as to effect the control of the machine A when the end of the film has been reached, thereby closing the various circuits controlling the latter of said projecting machines. The machine not in operation may of course be serviced by the operator so as to be ready for operation when the next change-over is to take place.

By the use of the controlling apparatus for the projecting machines, a single operator may thus service both machines where two operators have heretofore been required, effecting a considerable saving in operating expenses.

It will be noted that the switch arm 36 which is the last of the arms to operate, is also controlling a second switch 61 positioned in the current carrying line 50 leading from the power input line 49 to the switch arm which switch is normally closed and when opened by the movement of the arm 36, effects the breaking of the circuits involving the warning light 55, the primary motor circuit 45 and the circuit for the operation of the dowser mechanism 4.

This switch, illustrated to best advantage in Figs. 6 and 7 of the drawings, comprises a rigid contact finger 62 with which engages a second finger 63 of resilient form and capable of being flexed so as to disengage the finger 62 upon the engagement by the laterally directed projection 64 carried by the lower end of the arm 36. As this switch is situated at a point slightly to the rear of the switch contact 58, it will be observed that upon the movement of the arm 36 in its interlocking relation with the clutch plate 30, the contact 57 of the arm will first engage the cooperative contact 58 and close the circuit for the change-over or dowser mechanism 4. However, upon continued movement of the arm to position the projection 39 thereof fully within the slot 40 of the plate, the lateral projection 64 will engage the contact finger 63 releasing it from its contact with the finger 62 and thereby breaking the circuits for the projecting machine.

From the foregoing description, it will be manifest that the construction provides ready means whereby motion picture projecting machines may be automatically controlled in order to continuously exhibit a picture, one machine starting as soon as the film is unwound from the other machine. The controlling apparatus for each of the projecting machines is very simple in construction, having only a few operating parts which may be readily manipulated from the exterior of the controlling apparatus. The mere setting of the dials in one of the controlling apparatus connected for operation with one of the projecting machines, so that the enumerated graduations of the dial will correspond with the footage of the film in said machine, will automatically control the various circuits for the other projecting machine to effect the starting thereof when the film of the first machine has become unwound or shown. Likewise, after placing a previously measured film in the second projecting machine, the dials of the controlling apparatus connected up for movement therewith may also be so set as to effect the change-over to the first of said projecting machines.

Although each of the controlling apparatus has been provided with only three dial operated circuit controlling members, it will be understood that additional controlling members may be mounted therein for controlling various circuits effecting the operation of other mechanism in connection with the projecting apparatus.

What is claimed is:

1. In a motion picture projecting apparatus, the combination of a pair of power driven projecting machines, circuits for said machine, interconnected switch arms for closing the circuits, control members for said switch arms geared for operation with one of said machines and capable of being manually set to indicate a predetermined length of film, said control members being geared to move at different speeds and means on the slowest moving control member cooperating with said switch arms to keep the circuits open for the other of said projecting machines and prevent operation of the other control members until the predetermined length of film has passed through said first machine.

2. In a motion picture projecting apparatus, the combination of a pair of power driven projecting machines, circuits for said machines, switches in said circuits, shafts driven by one of said machines, reducing gears between said shafts, graduated dials carrying circular clutch plates mounted upon said shafts, friction clutches between said shafts and plates, said plates each being provided with a notch in their periphery, pivoted switch arms having projections arranged to be received within the notches of said plates, means tending to force the arms toward the plates to position the projections within said notches, whereby upon a predetermined rotation of the plates, the arms will effect the closing of the switches in the circuits for the other of said projecting machines.

3. In a motion picture projecting apparatus, the combination of a pair of power driven projecting machines, circuits for said machines, switches in said circuits, a circuit controlling apparatus connected for movement with one of said machines, said apparatus including notched plates mounted for rotation within the apparatus, means for rotating said plates at different speeds, pivoted switch arms arranged within said apparatus having projections arranged to be received within the notches of said plates, means tending to force the arms toward said plates whereby upon the rotation of said plates to effect the registration between said projections and notches of the plates, said switch arms will swing to positions closing switches for the respective circuits in the other of said projecting machines.

4. A circuit controlling mechanism for dual motion picture projecting machines comprising a support, a main shaft mounted for rotation on said support and driven by one of said projecting machines in timed relation therewith, a second shaft geared for rotation at a slower speed than said main shaft, a third shaft geared for rotation at a slower speed than said second shaft, cam plates frictionally secured to said second and third shafts for rotation therewith, switch means carried by said support, switch levers for actuating said switch means in response to movement controlled by said cam plates, and means interconnecting said levers to render the lever controlled by the cam plate on the second shaft inoperative until after the operation of the lever controlled by the cam plate on the third shaft.

5. A circuit controlling mechanism for dual motion picture projecting machines, comprising a support, a main shaft on said support driven by one of the projecting machines, a plurality of secondary shafts driven by said main shaft and operating at slower speeds, cam plates frictionally carried by said secondary shafts for rotation therewith, swinging arms arranged to cooperate with said cam plates, switch means arranged to be actuated by said swinging arms in response to the action of said cam plates and means interconnecting the arms to cause the arm controlled by the cam plate on the slowest moving shaft to render the other arms inoperative until after its own operation.

6. A circuit controlling mechanism for dual motion picture projecting machines comprising a support, a main shaft mounted for rotation on said support and arranged to be driven by one of said projecting machines, secondary shafts geared for rotation with said main shaft and operating at slower speeds, adjustable cam plates frictionally secured to said secondary shafts for rotation therewith, means for adjusting said cam plates, contact carrying levers each cooperating respectively with one of said cam plates, stationary contacts carried by said support and located in registration with the contacts carried by said levers whereby the former will be touched by the latter in response to the action of the cam plates on said levers, and manual means for separating said contacts.

7. A circuit controlling mechanism for a motion picture machine comprising a support, a main shaft mounted for rotation on said support and arranged to be driven directly by a second motion picture machine, a second shaft geared to rotate at one one-hundredth the speed of the main shaft, a third shaft geared to rotate at one thirtieth the speed of the second shaft, adjustable cam plates secured to said second and third shafts, means for adjusting said cam plates, movable levers carried by said support, switches arranged to be actuated by said movable levers in response to the action of the cam plates, and means controlled by the cam on the third shaft for rendering the levers cooperating with the cams on the second shaft inoperative for a predetermined time.

8. A circuit controlling mechanism for dual motion picture projecting machines comprising a shaft driven by one of said machines, additional shafts rotated at reduced speeds by said first shaft, clutch plates carried by said additional shafts for rotation therewith, interconnected switch controlling elements actuated by said clutch plates and means on the slowest moving clutch plate cooperating with said interconnected switch controlling elements to prevent actuation of the other switch elements, and means on the clutch plate travelling at intermediate speed to prevent operation of the third switch controlling element.

ROBERT S. BISSINGER.
HAROLD S. WARREN.